C. G. Udell.
Step Ladder.

№ 3,895. Fig 1. Reissued Mch. 22. 1870.

Witnesses.
G. L. Chapin.
E. E. Gibson.

Inventor.
C. G. Udell.

UNITED STATES PATENT OFFICE.

CALVIN G. UDELL, OF CHICAGO, ILLINOIS.

IMPROVEMENT IN STEP-LADDERS.

Specification forming part of Letters Patent No. 90,973, dated June 8, 1869; Reissue No. 3,895, dated March 22, 1870.

*To all whom it may concern:*

Be it known that I, CALVIN G. UDELL, of Chicago, in the county of Cook and State of Illinois, have invented an Improved Ladder; and I do hereby declare that the following is a full, clear, and exact description thereof, which will enable those skilled in the art to make and use the same, reference being had to the accompanying drawings and letters marked thereon, making a part of this specification, in which—

Figure 3:
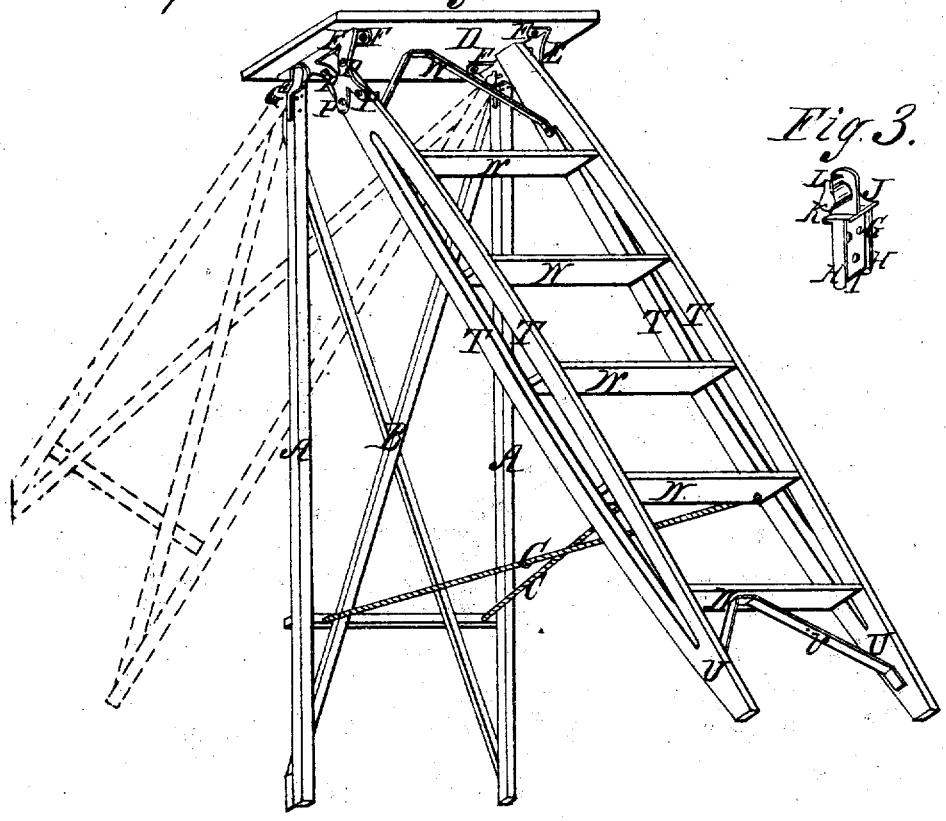
Figure 4:
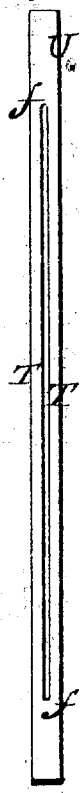
Figure 2:
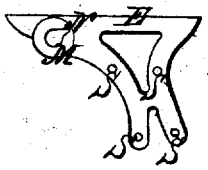

Figure 1 is a perspective representation of my improved step-ladder; Fig. 2, an elevation of one of the brackets used to support the platform and form a part of the hinge; Fig. 3, a perspective representation of one of the attachments for connecting the bracing-frame to the bracket; Fig. 4, an elevation of one of the stiles, showing how it is slotted out to form a double segment.

The nature of the invention consists of forming the stiles of the ladder of single pieces so slotted out and sprung apart as to form segment-braces at each edge, and in the peculiar bracket and hinge with which the supporting-frame and step part are connected, and, further, in the construction of the hinge connecting the stiles and movable legs.

The stiles U are formed by slotting out their central parts, as shown at Fig. 4, leaving the ends solid, and then clamping them at *f f*, and so spreading the parts T outward as to form segments, as shown at Fig. 1. They are then secured to the steps in the usual manner. Stiles made in this manner are much stronger and require less material in their construction than when formed of two segments fastened together at the ends, similar to those shown in Balsley's patent, while at the same time they can be made at less cost. Braces W V are used at the bottoms and tops of the larger ladders, but are not needed in the smaller ones.

W represents the steps, A B the bracing-frame, and D the platform, of the ladder.

E E are metal brackets, which are fastened to the stiles U U by means of screws P, Fig. 1, put through holes S, Fig. 2, and to a platform, D, by means of screws put through lugs F, and which have eyes M formed in them to receive pivots K, projecting out from the frame attachment G, Figs. 1 and 2, said eyes being elongated at N, Fig. 2, to allow lugs L, Fig. 3, to pass through the brackets when the frame A B is swung out, as seen by dotted lines, Fig. 1, and to hold the pivots in place when the frame is secured to the stiles U by the cords C. These attachments G have flanges J, Fig. 3, that fit squarely on the tops of the frame-pieces A A, and they are so recessed out on both sides as to leave flanges H, which are fitted closely to the edges of the frame-pieces A, the plates I between the flanges being fitted into slots made in the ends of said frame-pieces, and held there by rivets or wrought-nails put through holes in the plates made for this purpose. By means of this construction and arrangement the top part of the ladder is made very strong, and so as to support a much wider platform, D, than when the latter is fastened directly to the tops of the stiles U, while at the same time joints or hinges are provided, which are very strong and simple of construction, and so arranged as not to be detached from the frame-pieces A by use or accident. At the same time the ladder is made at less cost, and presents a neater appearance than when the hinges are fastened to wooden cleats, while at the same time the frame attachments G, having the flanges H H, which bear against the edges of the frame-pieces, are held more firmly in place than when rivets are wholly relied upon as a fastening.

Having thus described my invention, what I claim, and desire to secure by Letters Patent of the United States, is—

1. The stiles U, formed of single pieces of material, slotted out at their central parts and so sprung outward as to form segments T T, as set forth.

2. The bracket E, firmly connecting the stile T, or its equivalent, and platform D, and jointed to the leg A by the pivot-bolt K, constructed substantially as described.

CALVIN G. UDELL.

Witnesses:

R. D. O. SMITH,

C. A. HARKNESS.